June 3, 1941.   T. S. GRIMES   2,244,534
HULLER GIN
Filed Aug. 4, 1940
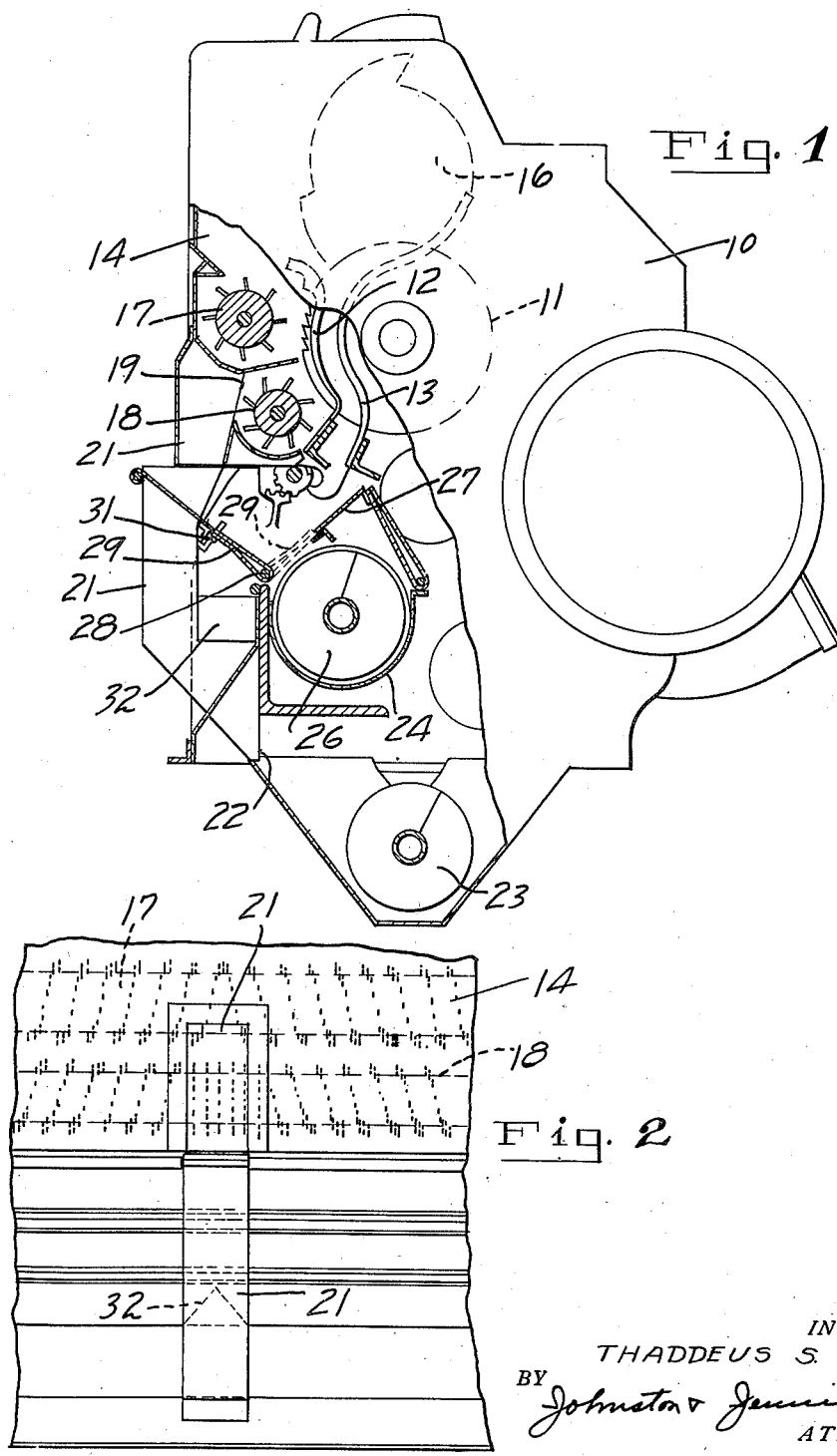
INVENTOR
THADDEUS S. GRIMES
BY Johnston & Jennings
ATTORNEYS Patented June 3, 1941

2,244,534

UNITED STATES PATENT OFFICE 2,244,534

HULLER GIN

Thaddeus S. Grimes, Columbus, Ga., assignor to Lummus Cotton Gin Company, a corporation of Georgia Application August 4, 1940, Serial No. 351,393

3 Claims. (Cl. 19—56)

My invention relates to a huller cotton gin, and has for its object to improve the discharge for hulls and cotton seed whereby the seed may be diverted from the regular seed conveyer through a special discharge opening at the front of the gin.

A further object of my invention is to provide a huller gin which shall include an improved seed discharge whereby the seeds from any batch of cotton being ginned may be separately discharged.

A more specific object of my invention is to provide a huller gin in which planting seed from any particular batch of cotton may be separately discharged and saved, free from contamination with previously ginned cotton seed.

As is well known, practically all gins now on the market are equipped with the double rib huller breast, the outer huller breast being for the purpose of removing hulls, rotten and immature locks of cotton, pebbles, and other foreign matter from the cotton before it enters the ginning roll box, thereby improving the sample of lint cotton. Seed from the double rib huller gin are normally discharged into a conveyer built into the gin, and the hulls are discharged in front of the gin into a separate conveyer, either on the gin floor or let down into the floor. In my prior Patent No. 1,244,196, dated October 23, 1917, I show an example of a huller breast gin which has since gone into wide use and which includes a center discharge in front of the gin stand for the hulls and other foreign matter. The seed are discharged into a conveyer trough beneath the gin. With such prior art apparatus it will be seen that if seed were discharged directly from the gin toward the front, they would pass through and be mixed with the hulls and other foreign matter discharged from the huller breast.

It has heretofore been the custom, with prior art apparatus, for a farmer who wished to save planting seed to take several bales of cotton to a gin at one time, of the variety from which he wished to save the seed. He would first have one or more bales ginned to clear out the seed conveyer of seeds from previously ginned bales, and then collect the seeds from the remaining bales for planting purposes. In this way, the farmer would not get so many foreign seed into his planting seed, but there was necessarily some contamination, as it would be practically impossible to thoroughly clean out seed from previous ginnings from the conveyer, bearing in mind that a conveyer usually serves a battery of several gin stands.

In accordance with my invention, I provide a means whereby the seed from any selected batch of cotton being ginned may be diverted directly from the saw cylinder of the gin and discharged at the front of the gin stand uncontaminated by the hulls. This is brought about by providing a separate narrow hull discharge spout from the front of the gin stand and providing a vane adapted in one position to guide the seeds into the trough of the seed conveyer, and in another position to divert the seed directly to the front. Other guide means direct the seed to the sides of the hull delivery spout, thus preventing an accumulation of seed behind the hull delivery spout.

Apparatus embodying features of my invention is illustrated in the accompanying drawing, forming a part of this application, in which Fig. 1 is an elevational view, partly in section, of a cotton gin embodying my improved huller gin breast; and Fig. 2 is a fragmentary front elevation showing the separate hull discharge spout.

Referring to the drawing for a better understanding of my invention, I show a gin stand 10 embodying a saw cylinder 11, huller ribs 12, and gin ribs 13. The outer or huller breast is shown at 14, and the ginning roll box at 16. Positioned in the huller breast 14 are picker rolls 17 and 18 arranged as shown in my prior Patent No. 1,244,196, to discharge the hulls and other foreign matter to the front at the center of the gin stand. The discharge opening is shown in Fig. 1 at 19, and connected thereto is a narrow hull discharge spot 21 which leads downwardly and inwardly in front of the gin stand, as shown, to discharge at 22 into a hull and trash conveyer 23 arranged beneath the gin stand.

Arranged above the hull and trash conveyer 23 is a seed conveyer trough 24 having a conveyer screw 26 therein, and which is adapted to receive the seed from the saw cylinder falling between the set of huller ribs 12 and gin ribs 13. A guide 27, arranged just below the lower end of the gin ribs 13, directs the seed toward the seed conveyer trough. Pivotally mounted at 28 alongside the front of the conveyer trough 24, is a vane 29 which, in the solid line position shown in the drawing, has its upper edge resting against an angle 31, extending across the front of the gin, and which acts in that position to direct the falling seeds into the seed conveyer trough 24.

When it is desired to discharge the seed from a particular batch of cotton to the front of the gin stand, the vane 29 is swung to the dotted line position shown in the drawing, where its upper edge bottoms against the lower edge of the guide 27 to cover and close off the seed conveyer trough, leaving the front of the gin stand open for the discharge of seeds on to the floor of the gin house in front of the gin stand. The vane 29 and guide 27 then cooperate to guide the falling seed over the conveyer trough 24. In order to prevent seed from hanging against the back of the hull discharge spout 21, I provide guide means 32 over the spout 21 which extend sharply upward to a peak, similar to the roof of a house, to shed seeds falling thereon to opposite sides of the hull discharge spout.

It will be seen that with my improved gin breast, whenever it is desired to save the seeds from a particular batch of cotton, all that is necessary is to first clean out the gin breast of all seed cotton from previous ginnings, and turn the vane or guide member 29 to the dotted line position shown in the drawing, whereupon the seeds are discharged to the front, as previously described, where they may be collected and saved.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. In a cotton gin, a saw cylinder, a gin breast, sets of spaced huller and gin ribs in the breast, a relatively narrow hull discharge spout at the front of the gin breast, a seed discharge opening between the huller and gin ribs, a seed conveyer disposed to receive the discharged seeds, and valve means for diverting the seeds past the seed conveyer and the hull discharge spout out of the front of the gin.

2. In a cotton gin, a huller gin breast embodying picker rolls adapted to discharge hulls at the front center of the gin, a downwardly extending central discharge spout for the hulls in front of the gin, a bottom discharge for seeds from the gin, a seed conveyer trough under the gin beneath the seed discharge, a guide to cause seeds to fall into the conveyer trough, a vane pivoted along one side of the trough and adapted in one position to close off the front of the gin and to direct the seeds into the seed trough, and in the other position to open the gin front and close the seed conveyer trough and cause seed to pass out of the front of the gin, and other guide means to cause seed discharged directly in the rear of the hull discharge spout to pass on opposite sides thereof.

3. In a cotton gin, a saw cylinder, a gin breast, sets of spaced huller and gin ribs in the breast, a relatively narrow hull discharge spout from the front of the gin breast, a seed discharge opening between the huller and gin ribs, a seed conveyer disposed to receive the discharged seeds, a baffle member extending across the gin front and pivoted alongside the front of the seed conveyer to divert seeds into and away from the seed conveyer and to open the gin front for the discharge of seed when in the last named position, and guide means to divert seed being discharged to the front around the hull spout.

THADDEUS S. GRIMES.